(12) United States Patent
Yang

(10) Patent No.: US 6,268,714 B1
(45) Date of Patent: *Jul. 31, 2001

(54) VOLTAGE LIMITING CIRCUIT CONNECTED IN PARALLEL WITH A BATTERY SET AND INCLUDING A SERIES-CONNECTED IMPEDANCE WHICH PERMITS LINEAR ADJUSTMENTS

(76) Inventor: Tai-Her Yang, No. 59, Chung Hsing 8 St., Si-Hu Town, Dzan-Hwa (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,462

(22) Filed: May 7, 1999

(51) Int. Cl.$^7$ ........................................... H02J 7/04
(52) U.S. Cl. ........................ 320/150; 320/116; 315/86
(58) Field of Search ................... 315/209 R, 86, 315/224, 291, 299, 301, 306, 307, 309, 310, 311, 205; 320/162, 160, 152, 153, 154, 150, 134, 137, 116

(56) References Cited

U.S. PATENT DOCUMENTS

| | | | |
|---|---|---|---|
| 4,463,283 | * | 7/1984 | Penney et al. ........................ 315/87 |
| 5,150,033 | * | 9/1992 | Conway ................................ 320/112 |
| 5,747,964 | * | 5/1998 | Turnbull .............................. 320/124 |
| 5,821,733 | * | 10/1998 | Turnbull .............................. 320/116 |
| 5,982,144 | * | 11/1999 | Johnson et al. ..................... 320/122 |

FOREIGN PATENT DOCUMENTS

662448 * 9/1987 (CH) .
6-150901 * 5/1994 (JP) .

* cited by examiner

Primary Examiner—Don Wong
Assistant Examiner—Ephrem Alemu
(74) Attorney, Agent, or Firm—Bacon & Thomas, PLLC

(57) ABSTRACT

A voltage limiter for a battery charger includes a diode connected in parallel across the terminals of the battery, the diode being further connected in series with an impedance arranged to counter changes in the diode forward voltage drop due to fluctuation in the charging current at saturation.

8 Claims, 2 Drawing Sheets

VOLTAGE LIMITING CIRCUIT CONNECTED IN PARALLEL WITH A BATTERY SET AND INCLUDING A SERIES-CONNECTED IMPEDANCE WHICH PERMITS LINEAR ADJUSTMENTS

BACKGROUND OF THE INVENTION

1. Field of the Invention

The invention concerns a voltage-limiting circuit device for a battery charger, and more particularly a voltage-limiting circuit device that permits linear adjustments so that the device is compatible with any battery set regardless of the saturation voltage VS.

2. Description of the Prior Art

In the instance (1) where charging is carried out with respect to the output terminals of a multiple voltage output circuit that exhibits a forward diode voltage drop effect such as is disclosed in U.S. Pat. No. 5,118,993 granted to the Applicant hereof, by connecting a battery pack directly in parallel thereto, or (2) where, per traditional practice, a diode is connected directly in parallel with the battery pack to provide voltage-limiting tributary currents by the realization of a diode-forward voltage drop VF, the battery pack terminal voltage VB will increase gradually in proportion to accumulated charging, as the battery pack is being charged, to a level close to the forward diode voltage drop VF. When the forward diode voltage drop matches the battery pack terminal voltage VB that is increasing commensurate with cumulative charging, a steady state is reached. In that event, however, should the voltage drop in the forward direction because the parallel diode voltage drop VF differs from the rated saturation voltage VS of the battery pack, since the diode forward voltage drop VF is subject to a stage by stage fluctuation at an approximate rate of 0.7V per series connection of diode, it would be very difficult to effect matching with the rated battery pack saturation voltage by altering serial connection of diodes. Indeed, up to this date there has been no revelation or disclosure available which teaches linear adjustment or matching between both, so it follows that the traditional practice of connecting diodes directly in parallel with the battery pack will inevitably incur two shortcomings in the course of charging: (1) where the diode is not protected by a current limiter connected in series therewith, then the current flowing through the diode when both the diode forward voltage drop VF and the battery pack terminal voltage VB reach a steady state will increase abruptly, eventually resulting in burning of the diode; and (2) the diode forward voltage drop VF will be inconsistent with the charging voltage nominally required by the battery pack, resulting inevitably in retarded or inadequate charging if the voltage drop VF is the less than the required charging voltage, or alternatively overcharging if the voltage drop VF is greater than the required charging voltage.

SUMMARY OF THE INVENTION

The present invention features a more advanced capability of allowing for linear adjustments as well as a simplified, cost-effective circuit design. The circuit device makes it possible to match the saturation voltage VS of various battery packs by effecting current limitation in the form of linear adjustments using an impedance ZO connected in series with the diode. The adjustments to the current flowing past the diode at the moment when the battery pack is being charged and the battery pack terminal voltage VB is increasing to a point beyond the diode forward voltage drop VF permits the battery pack to acquire saturation charging irrespective of its rated saturation voltage, assuring prevention of overcharging or loss and damage with respect to the diode or Zener diode connected in parallel with the battery pack in particular.

DETAILED DESCRIPTION OF THE PREFERRED EMBODIMENTS

Figure 1:
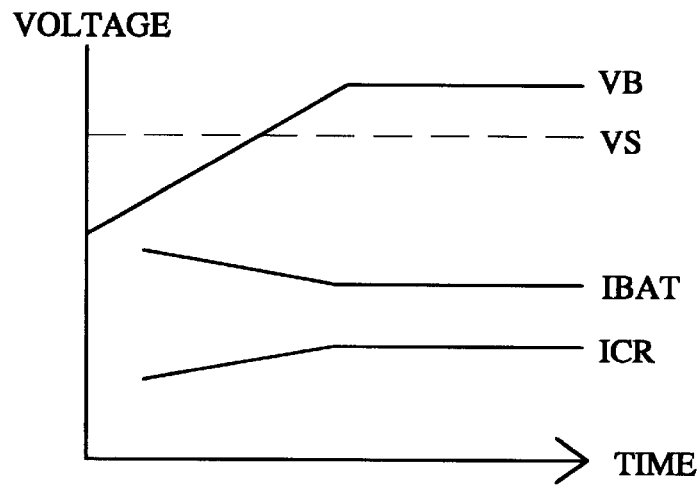
FIG. 1 is a procedural illustration of an overcharging situation on the part of a battery pack in direct parallel connection with a voltage limiting diode according to the traditional art.
Figure 2:
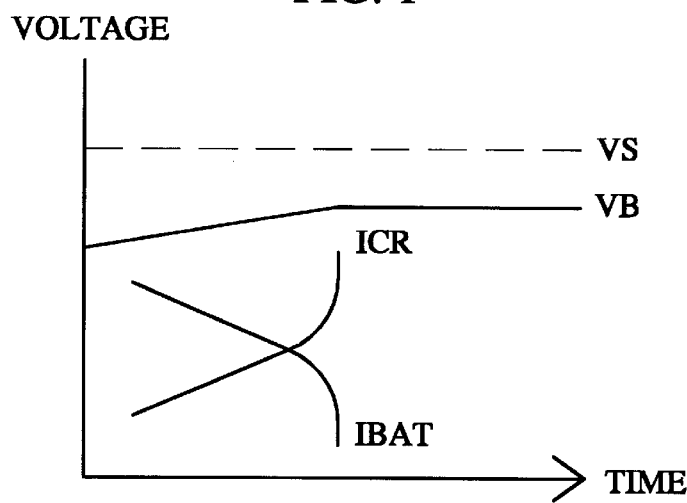
FIG. 2 is a procedural illustration of an undercharge situation on the part of a battery pack in direct parallel connection with a voltage limiting diode according to the traditional art.
Figure 3:
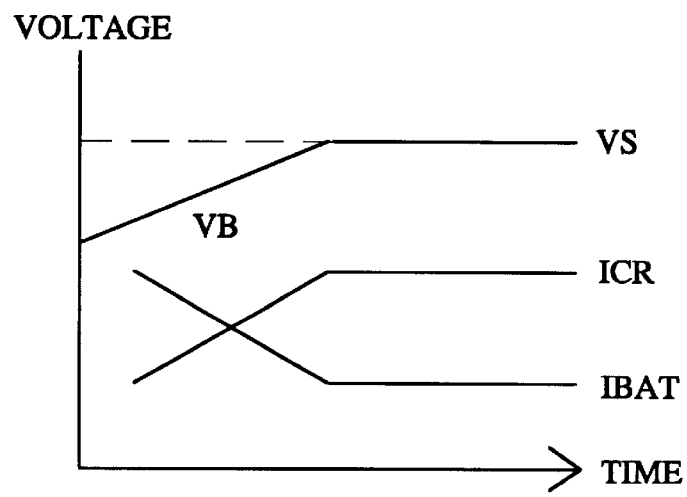
FIG. 3 is a procedural illustration of the ideal charging characteristics realized with a battery pack that is in direct parallel connection with a voltage limiting diode according to the traditional art.

In applications where two serial diodes are connected in parallel across both terminals of a battery pack to serve as voltage-limiting elements according to the prior art, it will be seen that sometime during application of charging current to the diodes and the battery pack in parallel therewith, the diode forward voltage drop VF and the battery terminal voltage VB will combine to form a stable voltage, current being divided to pass through the diodes an the one hand and through the battery pack on the other hand. In cases where the compounded, stable terminal voltage is greater than the standard composite voltage VS of the battery pack, once the charging comes to saturation, then the charging current IB at the battery pack will be too high, resulting in damage to the battery pack due to heating associated with overcharging, as shown in FIG. 1. In instances, however, where the steady-state compound voltage in the course of charging is less than the standard composite voltage VS of the battery pack upon charging saturation, the battery pack charging current IBAT will be reduced to a minimum or even to zero, whereupon full charging of the battery pack is impossible, as shown in FIG. 2. This drawback exists even with U.S. Pat. No. 5,118,993, granted previously to Applicant, as well as EC Patent No. 0487204, also granted to Applicant, which disclose a multiple voltage output for the purpose of charging a given battery pack, the arrangement involving a diode forward voltage drop VF directly in parallel with the battery pack. Such an arrangement will inevitably incur the shortcoming that when the battery pack terminal voltage VB exceeds the diode forward voltage drop while the battery pack is active in a charging process, the current passing through the diode ICR will increase abruptly, thus failing to achieve a linear adjustment performance. As a result, it is unlikely that the battery pack will charge to the extent that the compounded steady state terminal voltage will be comparable with the standard voltage VS of the same battery pack charged to saturation, so that the ICR passing the diode and the IBAT, that is, the battery pack charging current, will have an optimum distribution status. It is therefore impossible to impose restriction on currents passing the diode, which eventually suffers damage from over-heating. In contrast, the present invention provides a circuit device that allows linear adjustments with respect to a battery pack to which one Zener diode, or multiple series-connected diodes, are connected in parallel. The linear adjustment is achieved by connecting the diode in series with an impedance serving the purpose of making linear current adjustments ZO, and causing a voltage drop together with the branch current ICR flowing past the diode. The voltage drop VZO across the zener diode that will vary as a function of a fluctuation in the ICR, thereby obtaining a voltage that, when employed to charge the battery pack, effects linear adjustments in response to the magnitude of the ongoing branch current, and further provides a chosen and steady composite voltage together with the parallel connected battery pack, as well as an optimum match comparable with or approximating the saturated standard voltage VS of the respective battery pack as illustrated in FIG. 3, while the current flowing through the diode also receives impedance ZO-induced linear adjustments.

Figure 4:
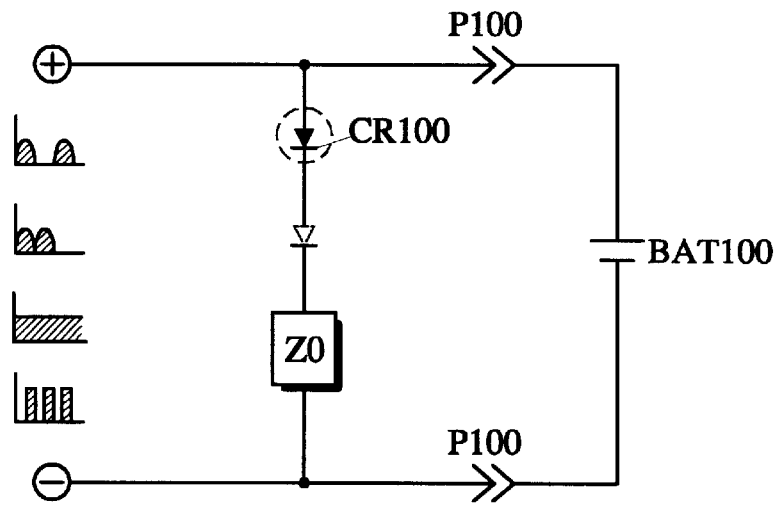
FIG. 4 is a circuit schematic of the preferred voltage limiting device which permits linear adjustments, applied to a single battery assembly pack.

As shown in the circuit diagram of FIG. 4, the preferred voltage-limiting device for making linear adjustments matched to a single battery pack according to the present invention includes the following elements:

a serial combination of one or more than one diode or, alternatively, two or more kinds of diodes in mixed series connection that are further arranged in series connection with an impedance ZO to provide voltage-limiting effects derived from the forward voltage drop of the diode and from the serially connected Impedance ZO; the voltage drop produced by the branch current passing the device being coupled across both terminals of the battery pack with like polarities;

an assembly of one single set of cells or a multiple series-connected cell pack, whether of lead acid, nickel-hydrogen, nickel-zinc, nickel-cadmium, nickel-iron, lithium type, or any other rechargeable secondary battery, to be coupled to the subject voltage-limiting circuit device by way of:

(1) a direct parallel connection relative to negative and positive, positive to positive, or negative to negative polarities; or (2) a like-polarity-to-like-polarity connection to both terminals of the battery pack by means of a switch, plug-socket assembly, or coupling terminal P100, so that the positive polarity terminal on the battery pack is in contact with the terminal on the linearly adjustable circuit device through which a positive voltage is produced when the branch current passes by, and so that the negative polarity on the battery pack is connected to the terminal on the linearly adjustable circuit device through which negative voltage is produced when branch current passes by.

On the linearly adjustable voltage-limiting circuit device connected in parallel with a battery pack as illustrated in FIG. 4, the input terminal may be coupled to any of a variety of charging devices, so that control or cutoff of the power supply is dictated (1) by testing of the terminal voltage of the battery pack that is being charged, (2) by manual cutoff when the charging reaches saturation, (3) in reference to the temperature rising effect as the charging reaches saturation, or (4) in reference to the negative voltage effect as the charging reaches saturation. Alternatively, charging to the battery pack may be controlled or cut off by a timer device or any other means capable of manipulating charging voltage/current.

Figure 5:
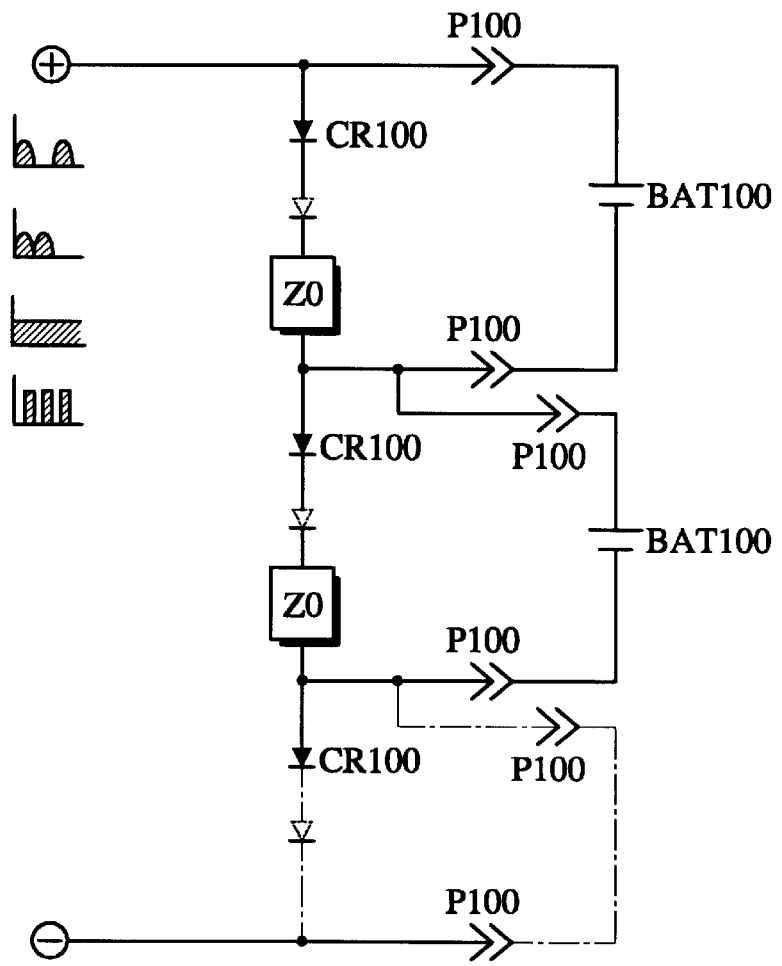
FIG. 5 is a circuit schematic of the preferred voltage-limiting device which permits linear adjustments, applied to multiple battery assembly packs.

The linearly adjustable voltage-limiting circuit device in parallel with the battery pack may further be arranged in series connection with a plurality of linearly adjustable voltage-limiting circuit devices of the same type as described above on a like-polarity-to-like-polarity basis, so as to constitute multiple output circuits including, as illustrated in FIG. 5, the following:

a series connection of one or more than one diode, simple series mode or composite series mode included, to be further series connected with an impedance ZO, thereby realizing the subject linearly adjustable voltage-limiting circuit device as a result of the forward voltage drop characteristics of the diode and the voltage-limiting characteristics of both the Zener diode and the serial impedance ZO. Further, two or more sets of such linearly adjustable voltage-limiting circuits may be connected in series with like polarity superposed on like polarity, and coupled on a like-polarity-on-like-polarity basis to both terminals of the battery pack in compliance with the voltage-drop characteristics of a branch current passing through the device;

lead acid, nickel-hydrogen, nickel-zinc, nickel-cadmium, nickel-iron, lithium cells, provided singly or in the form of a serial assembly comprising a plurality of cells, or any other cell of the rechargeable secondary type, to be coupled to said linearly adjustable voltage-limiting circuit device by:

(1) parallel connection therewith, with like polarities inter-connected altogether;

(2) the intervention of switches, a plug-socket assembly or adaptor P100, so that like polarities thereon are connected to like polarities on the device, with the positive polarity of each cell connected to a corresponding terminal on the linearly adjustable voltage-limiting circuit from which the positive voltage is produced as branch current passes through the circuit, and with the negative polarity on each cell being connected to the terminal on the linearly adjustable limiting circuit from which negative voltage is produced as branch current passes through the circuit. The individual output terminal on each linearly adjustable voltage-limiting circuit which is connected in series with each other on a like-polarity-on-like-polarity basis may be coupled to a chargeable call so as to charge the cell individually or collectively. The assembly of a series of linearly adjustable voltage-limiting circuits characterized by like-polarity-on-like-polarity interconnection, once duly charged, disposes of its output by:

(1) having the output terminals connected concomitantly to the chargeable call;

(2) having part of each linearly adjustable voltage-limiting circuit connected to the chargeable cell, and the remaining part thereof providing a voltage splitting effect.

In the linearly adjustable voltage-limiting circuit in parallel with the cell as illustrated in FIG. 5, the input terminal may be coupled to any of a variety of charging circuits, and charging cut-off may be (1) effected manually once saturation is reached, (2) effected by the temperature rise which accompanies the saturation, or the negative voltage emerging in the same condition, or (3) by a timer or any other means convenient and pertinent to control of the charge.

In addition, the diode as illustrated in FIGS. 4 and 5, the impedance ZO included, may be made from materials described below by taking into account circuitry requirements:

for impedance ZO, a resistive impedance may be used generally but an inductive impedance, capacitive impedance or two or more out of resistive, inductive, and/or capacitive impedances are preferred in cases where the D.C. power supply is of a ripple pulsating type;

if a resistive impedance is used, the impedance is preferably in the form of a solely positive temperature coefficient (PTC) or negative temperature coefficient (NTC) type resistor, or alternatively a composite resistance made up of serial, parallel, or compound serial/parallel connected resistances embodying both the PTC and NTC types;

the diodes are preferably one composed of different materials and structural makeup, or alternatively solid state electronic components exhibiting a feature similar to a diode forward voltage drop effect when the diode turns conductive with current flowing therethrough.

In summation, the invention is a linearly adjustable voltage-limiting circuit device connected in parallel with a battery pack to protect the battery pack from charging saturation, and consequently, prevent damage to the battery pack due to overcharging, and yet can be implemented in a reasonable, low cost manner.

What is claimed is:

1. A voltage limiter, comprising:

at least one diode connected in series with an impedance, said series-connected diode and impedance being further connected in parallel with a battery set, wherein the diode is arranged such that a terminal voltage of the battery set increases with accumulated charging until the terminal voltage matches a sum of a forward voltage drop across the at least one diode and a voltage drop across the impedance, and wherein the impedance has a temperature coefficient that causes the impedance to change in response to changes in temperature; said forward voltage drop across the at least one diode being subject to fluctuations in a charging current, and said voltage drop across the impedance compensating for fluctuations in the charging current.

2. A voltage limiter as claimed in claim 1, wherein said impedance has a negative temperature coefficient.

3. A voltage limiter as claimed in claim 1, wherein said impedance has a positive temperature coefficient.

4. A voltage limiter as claimed in claim 1, wherein said impedance is a composite impedance comprises both positive temperature coefficient and negative temperature coefficient elements.

5. A voltage limiter, comprising:

at least two voltage limiting circuits, each circuit comprising at least one diode connected in series with an impedance, and each circuit being connected in parallel with one of a plurality of battery sets, wherein each of said at least one diodes is arranged such that a terminal voltage of a respective battery set increases with accumulated charging until the terminal voltage matches a sum of a forward voltage drop across the at least one diode and a voltage drop across the impedance, and wherein the impedance has a temperature coefficient that causes the impedance to change in response to changes in temperature, said forward voltage drop across the at least one diode being subject to fluctuations in a charging current, and said voltage drop across the impedance compensating for fluctuations in the charging current.

6. A voltage limiter as claimed in claim 5, wherein said impedance has a negative temperature coefficient.

7. A voltage limiter as claimed in claim 5, wherein said impedance has a positive temperature coefficient.

8. A voltage limiter as claimed in claim 5, wherein said impedance is a composite impedance comprises both positive temperature coefficient and negative temperature coefficient elements.

* * * * *